March 3, 1931.  L. M. PERKINS  1,794,980
MOTOR CONTROL SYSTEM
Original Filed April 2, 1925    2 Sheets-Sheet 1

WITNESSES:

INVENTOR
Laurence M. Perkins
BY
ATTORNEY

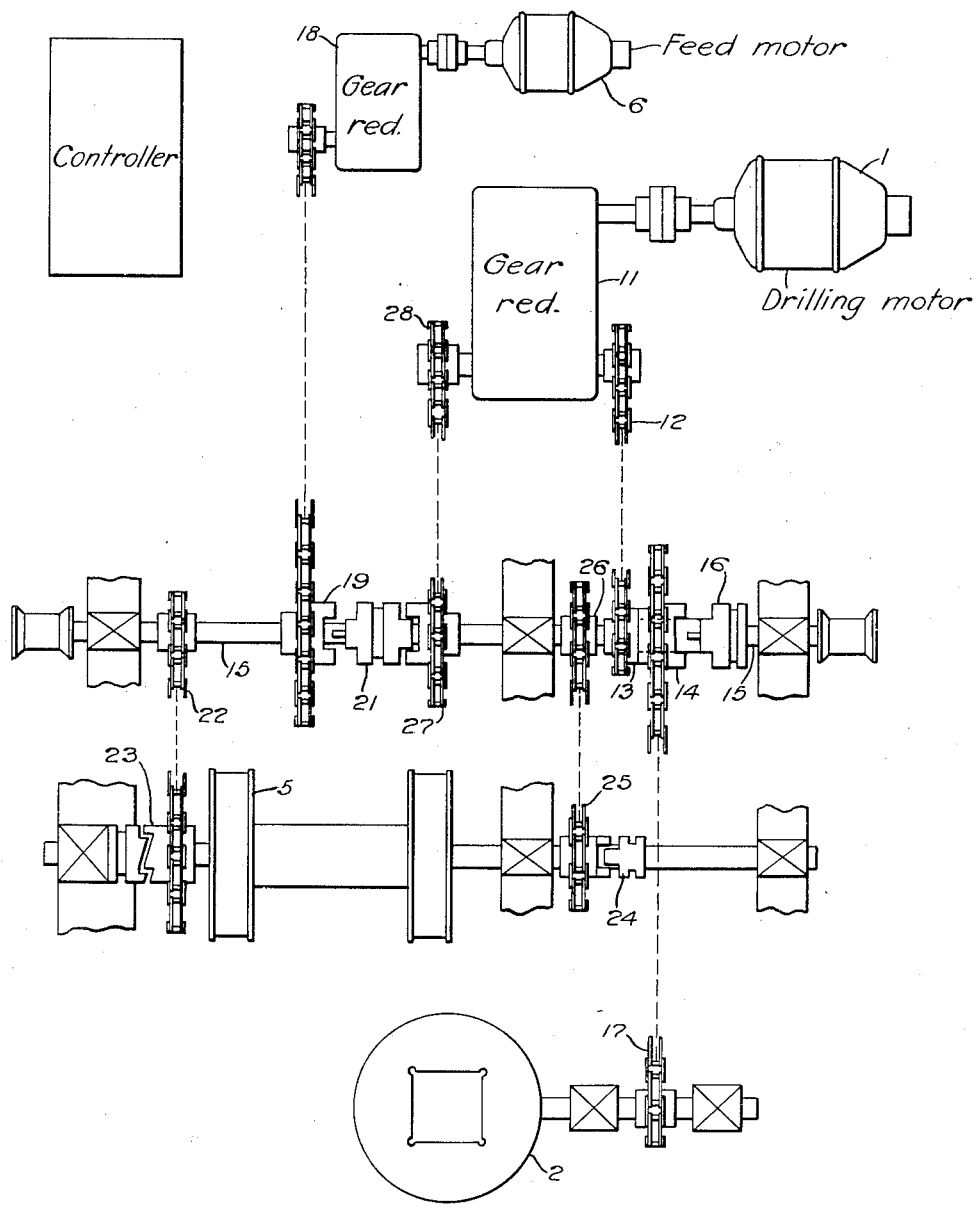

Patented Mar. 3, 1931

1,794,980

UNITED STATES PATENT OFFICE

LAURENCE M. PERKINS, OF WILKINSBURG, PENNSYLVANIA, ASSIGNOR TO WESTINGHOUSE ELECTRIC & MANUFACTURING COMPANY, A CORPORATION OF PENNSYLVANIA

MOTOR-CONTROL SYSTEM

Application filed April 2, 1925, Serial No. 20,085. Renewed March 15, 1929.

My invention relates to systems of motor control and it has particular relation to such systems as are employed in connection with earth drilling and similar applications.

An object of my invention is to provide electrical means for varying the pressure on the drilling tool in accordance with the resistance met in the drilling operation.

Mechanical devices have been employed in prior systems for controlling the drilling pressure in accordance with the load, whereas, in accordance with my invention the equipment is greatly simplified, and rendered more effective, by employing two alternating-current induction motors having their windings connected preferably in cascade relation.

The first motor, which is directly connected to the line, performs the customary drilling operation, while the second motor is governed in accordance with the current traversing the first motor and operates to relieve the pressure on the drill-bit in accordance with the load conditions.

Figure 1:
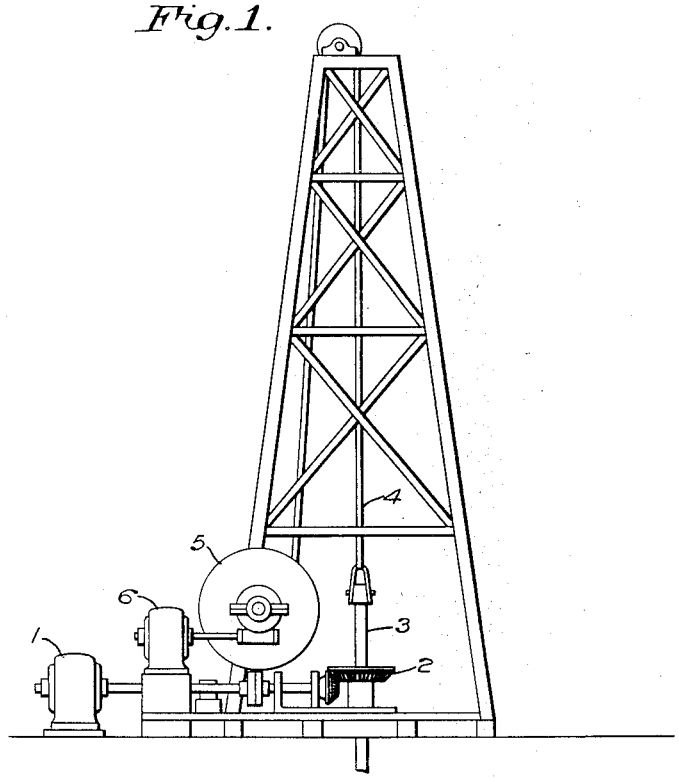

My invention will be best understood by reference to the accompanying drawing in which Figure 1 illustrates a derrick of familiar character, employed in connection with rotary earth drilling, to which my invention is applied.

Figure 2:
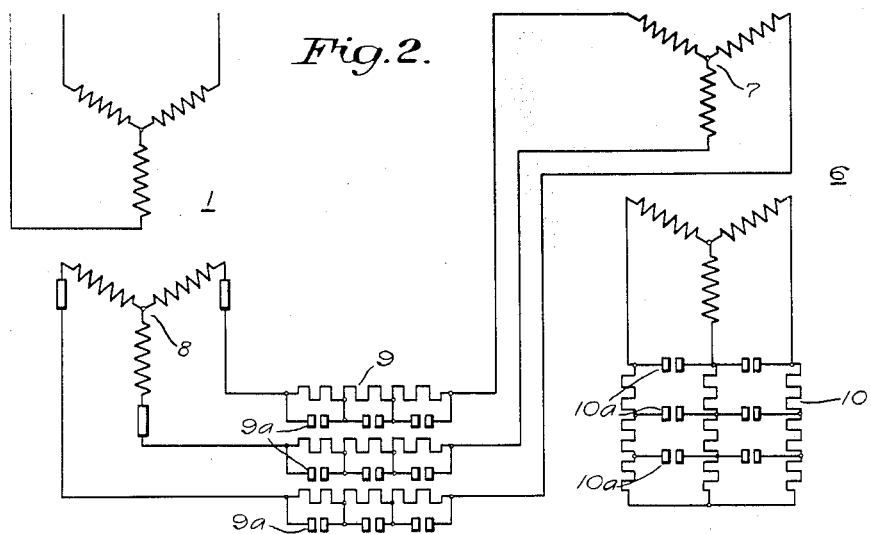

Figure 2 is a diagrammatic representation of the scheme of main circuit connections embodying my invention, and, Figure 3 is a diagrammatic view of the general mechanical arrangement of my invention as applied to a rotary drill rig.

Referring to Figs. 1 and 2, an induction motor 1, preferably of the wound-rotor type, is connected through suitable gearing to operate a rotary table 2. The square drill stem 3 is rotated by means of the table and is suspended by means of a cable 4 that is wound on a hoist drum 5, in accordance with a familiar practice. The hoist drum is operated, through worm gearing, or otherwise, by means of an induction motor 6, preferably of the wound-rotor type. The motor 6 operates on the principle of a "torque motor," whereby its torque is exerted in opposition to the weight of the suspended tool 3, and it functions as a "feed" motor in conjunction with the gravity feeding of the tool itself.

The primary windings 7 of the feed motor 6 receive energy from the secondary windings 8 of drilling motor 1, the primary windings of which are connected to a suitable supply circuit. Means for regulating the speed of motor 1 comprises a plurality of resistor sections 9 that are connected intermediate the secondary windings 8 and the primary windings 7; that is, in the cascade connection. These resistors also have an affect upon the torque motor 6, but the latter is provided with additional regulating means, comprising secondary-circuit resistor sections 10 that are primarily adapted for regulating the torque of this motor. The resistors 9 and 10 may be adjusted by means of the illustrated sets of switches 9a and 10a, respectively, or in any other suitable manner.

Referring to Fig. 3, the drilling motor 1 is connected through a suitable gear unit 11 which, according to the present layout, provides a 4 to 1 speed reduction. A chain and sprocket mechanism 12 is adapted to drive a pair of sprockets 13 and 14 which are loosely mounted on a shaft 15 and engaged by a mechanically operable clutch 16. When clutch 16 engages sprockets 13 and 14, the drilling motor is operatively connected to the table 2 through the sprocket 17. The feed motor 6 is connected through a 5 to 1 gear-reduction unit 18 for driving a sprocket-wheel 19 that is loosely mounted on the shaft 15.

A double-throw clutch 21, when actuated to its left-hand operative position, engages sprocket 19 to effect rotation of shaft 15 which, in turn, operates the winding drum 5 through a chain 22 and a suitable clutch 23 on the drum shaft. The clutch 21, in its right-hand position, is utilized during hoisting operations, as hereinafter described. When desired, a different gear-ratio may be employed between the feed motor 6 and the drum 5 and is rendered effective by means of a clutch 24 on the drum shaft, which clutch is adapted to connect shaft 15 with the drum through a chain 25 and a sprocket-wheel 26 that is keyed to shaft 15. During this operation clutch 23 is rendered inoperative.

During the drilling operation the motors 1 and 6 are connected in cascade relation as illustrated in Fig. 2. The speed of the drilling motor 1 is adjusted by means of resistor switches 9a and the proper drilling pressure is obtained by means of the regulating resistor switches 10a, thereby controlling the torque of the feed motor 6. This motor normally remains substantially at a standstill and only supplies sufficient torque to the winding drum 5 to balance any desired portion of the weight of the suspended tool 3. As the drilling process progresses, the tool is gradually fed by gravity against the restraining effort of the feed motor. During this process, if greater than normal drilling resistance is encountered, there is, of course, a corresponding increase in current drawn by the motor 1, thereby effecting a corresponding increase in the excitation of the primary winding 7 of the feed motor 6, which thereupon tends to raise the drill 3 against the action of gravity and relieve the drilling pressure. The converse effect, of course, occurs whenever a decrease in drilling resistance takes place.

The adjustment of resistors 9 and 10 permits of a wide range of speed and torque control for various conditions that will necessarily be encountered in the drilling of deep wells. In addition to this adjustment, the change in gear ratio is provided between the feed motor 6 and the drum 5. That is to say, during shallow drilling, the clutch 24 may be engaged to provide a comparatively low gear-ratio, whereas, at extreme depths, it may be advisable to engage clutch 23 to provide a higher gear-reduction, whereby the torque of the feed motor becomes more effective, to overcome the additional weight of pipe that is then attached to the drill stem 3.

I have found it to be advantageous to provide resistors 9, of suitable ohmic value, whereby the speed of the drilling motor 1 may be reduced to approximately 60% of its normal speed. Resistors 10 are of such value that the torque of the feed motor 6 may be regulated between the values corresponding to normal speed of motor 1 and to 60% of said speed. I have found it impractical to obtain speed-reduction of the drilling motor solely by means of resistors in the secondary circuit of the feed motor, on account of the fact that the feed motor, thereby develops too much torque and is overloaded. In practicing my invention, I find that it is practical to employ two standard motors of suitable characteristics as, for example, a drilling motor in which the relation of primary voltage to secondary voltage is in the ratio of 413:432 and for the feed motor, the ratio of primary voltage to secondary voltage may be 210:380.

When hoisting the tool out of the well, pulling casing, etc., clutch 16 is disengaged and clutch 21 is actuated to the right-hand illustrated position to lock sprocket 27 to shaft 15. Clutch 24 is also engaged whereby the motor 1 is connected for hoisting only and operates drum 5 through the gear-train comprising chain and sprocket members 25 to 28, inclusive, and gear unit 11.

For the process known as "circulating", in which mud is introduced into the well to build up a retaining wall when sand is struck, the same connections are employed as for hoisting except that clutch 16 is engaged for driving the table 2 at low speed and neither clutches 23 nor 24 are employed.

The several operations incidental to earth-drilling are well understood by those familiar with the art and it is believed to be unnecessary to further elaborate upon the application of my apparatus in connection with the usual functions of drilling, hoisting and circulating.

Various modifications of my invention may occur to those skilled in the art and I desire, therefore, that my invention shall be limited only in accordance with the scope of the appended claims.

I claim as my invention:

1. In an earth-drilling system, the combination with a drilling tool and an alternating-current motor for rotating the tool, of a second motor for raising and lowering said tool, said motors having their windings connected in cascade relation.

2. In an earth-drilling system, the combination with a drilling tool and an alternating-current motor for rotating the tool, of gravity-actuated means for feeding said tool, and a second motor responsive to the secondary current of the first-named motor for controlling the feeding means.

3. In an earth-drilling system, the combination with a drilling tool and an alternating-current motor for rotating the tool, of a second motor for raising and lowering said tool, said second motor being responsive to the load on the first-named motor, and means for connecting either of said motors to raise said tool.

4. In an earth-drilling system, the combination with a drilling tool and an alternating-current motor for rotating the tool, of gravity-actuated means for feeding said tool, a second motor responsive to the load on the first-named motor for controlling the feeding means, and means for rendering said motors effective for hoisting only.

5. In an earth-drilling system, the combination with a drilling tool and an alternating-current motor for rotating the tool, of a second motor for raising and lowering said tool, said motors having their windings connected in cascade relation, and means connected between said motors for varying the speed of the drilling motor and the torque of said second motor.

6. In an earth-drilling system, the combination with a drilling tool and an alternating-current motor for rotating the tool, of a second motor for raising and lowering said tool, said motors having their windings connected in cascade relation, means for varying the speed of the drilling motor, and means for varying the torque of said second motor.

7. In an earth-drilling system, the combination with a drilling tool and an alternating-current induction motor therefor having a primary and a secondary winding, of a second induction motor having a winding responsive to current traversing the secondary winding of said first-named motor for controlling said tool.

8. In an earth-drilling system, the combination with a drilling tool and an alternating-current induction motor for rotating the tool, of a second alternating-current induction motor for raising and lowering said tool, the primary winding of the second named motor being connected in series with the secondary winding of the first named motor, a plurality of variable resistors connected intermediate said windings for controlling the speed of said first named motor, and a plurality of variable resistors connected in the secondary winding of the second named motor for varying the torque of said motor.

9. In an earth-drilling system, the combination with a drilling tool and an induction motor for rotating the tool, of a second induction motor for raising and lowering said tool, the secondary winding of said drilling motor being connected to the primary winding of said second motor, and a plurality of variable resistors connected intermediate said windings to vary the speed of the drilling motor and the torque of said second motor.

10. In an earth-drilling system, the combination with a drilling tool and an induction motor for rotating the tool, of a second induction motor for raising and lowering said tool, said motors having their windings connected in cascade relation, means for varying the speed of the drilling motor, means for varying the torque of said second motor, and means for connecting either of said motors to raise said tool and thus interrupt the drilling operation.

11. In an earth-drilling system, the combination with a drilling tool and an induction motor for rotating the tool, of a second induction motor for raising and lowering said tool, the secondary winding of the drilling motor being connected in series with the primary winding of said second motor whereby the operation of said second motor is made directly dependent on the load of said drilling motor, a plurality of resistors connected between the secondary of the drilling motor and the primary of the second motor, a plurality of switches associated with said resistors adapted to vary the resistance value of said resistors and thus vary the speed of of said drilling motor, a plurality of resistors in the secondary of the second motor, and a plurality of switches associated with said resistors adapted to vary the resistance value of said last named resistors and thus vary the torque of said second motor.

In testimony whereof, I have hereunto subscribed my name this 31st day of March, 1925.

LAURENCE M. PERKINS.